(12) United States Patent
Dharmarajan et al.

(10) Patent No.: US 9,558,177 B2
(45) Date of Patent: *Jan. 31, 2017

(54) USER INTERFACE AND GEO-PARSING DATA STRUCTURE

(71) Applicant: MICROSOFT CORPORATION, Redmond, WA (US)

(72) Inventors: Baskaran Dharmarajan, Sprinfield, IL (US); Jay C. Jacobs, Danville, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/152,210

(22) Filed: Jan. 10, 2014

(65) Prior Publication Data

US 2014/0289235 A1    Sep. 25, 2014

Related U.S. Application Data

(60) Continuation of application No. 13/572,974, filed on Aug. 13, 2012, now Pat. No. 8,635,231, which is a continuation of application No. 12/764,276, filed on Apr. 21, 2010, now Pat. No. 8,271,562, which is a division of application No. 11/196,387, filed on Aug. 4, 2005, now abandoned.

(51) Int. Cl.
*G06F 17/30* (2006.01)
*G06F 17/27* (2006.01)
*G06Q 30/02* (2012.01)

(52) U.S. Cl.
CPC ..... *G06F 17/2705* (2013.01); *G06F 17/30241* (2013.01); *G06F 17/30336* (2013.01); *G06Q 30/0201* (2013.01)

(58) Field of Classification Search
CPC ............ G06F 17/2705; G06F 17/30336; G06F 17/30241; G06Q 30/0201
See application file for complete search history.

(56) References Cited

U.S. PATENT DOCUMENTS

| | | | |
|---|---|---|---|
| 5,778,357 A | 7/1998 | Kolton et al. | |
| 6,922,703 B1* | 7/2005 | Snyder et al. | ................ 345/633 |
| 7,685,108 B2* | 3/2010 | Miller | ............... G06F 17/30241 |
| | | | 701/533 |
| 8,014,945 B2* | 9/2011 | Cooper | .................. G01C 21/26 |
| | | | 701/452 |

(Continued)

OTHER PUBLICATIONS

Restriction Requirement in U.S. Appl. No. 11/196,387, mail date: May 19, 2008.

(Continued)

*Primary Examiner* — Leslie Wong
(74) *Attorney, Agent, or Firm* — Bryan Webster; Dan Choi; Micky Minhas (57) ABSTRACT

A method to allocate memory, in response to application requests, for a compact data structure having location data and a trailer section is provided. The trailer section of the compact data structure is checked to determine an offset for listings and indices representing the location data. Upon determining the offset, the listings and indices are loaded into memory and responses to the application requests are generated by utilizing the listings and indices stored in the memory.

19 Claims, 7 Drawing Sheets

(56) References Cited

U.S. PATENT DOCUMENTS

| | | | | |
|---|---|---|---|---|
| 8,085,813 B2* | 12/2011 | Melick | ............ | H04L 29/12783 370/473 |
| 8,103,445 B2* | 1/2012 | Smith | ............ | G08G 1/0962 340/995.14 |
| 8,271,562 B2* | 9/2012 | Dharmarajan | .... | G06F 17/30241 701/410 |
| 2003/0036842 A1* | 2/2003 | Hancock | ............ | G01C 21/20 701/532 |
| 2003/0158667 A1* | 8/2003 | Chen | ............ | G06F 17/30241 702/5 |
| 2003/0220835 A1* | 11/2003 | Barnes, Jr. | ............ | G06Q 10/1053 705/14.36 |
| 2004/0066330 A1* | 4/2004 | Knockeart | ............ | G01C 21/3415 342/357.31 |
| 2004/0104842 A1* | 6/2004 | Drury | ............ | G01C 21/34 342/357.31 |
| 2005/0172024 A1* | 8/2005 | Cheifot | ............ | H04L 29/12009 709/225 |
| 2005/0268070 A1 | 12/2005 | Baxter | | |
| 2005/0270306 A1* | 12/2005 | Nomura | ............ | 345/619 |
| 2006/0074986 A1 | 4/2006 | Mallalieu et al. | | |
| 2006/0100999 A1 | 5/2006 | Sencaj et al. | | |
| 2006/0106738 A1 | 5/2006 | Schleicher | | |
| 2006/0149742 A1* | 7/2006 | Egnor | ............ | G06F 17/30613 |
| 2006/0241860 A1* | 10/2006 | Kimchi | ............ | G01C 21/26 701/532 |
| 2008/0059419 A1 | 3/2008 | Auerbach | | |
| 2008/0183376 A1* | 7/2008 | Knockeart | ............ | G01C 21/3415 701/119 |
| 2008/0233927 A1* | 9/2008 | Moon | ............ | G06F 17/3087 455/414.1 |
| 2010/0002604 A1* | 1/2010 | Melick | ............ | H04L 29/12783 370/254 |
| 2011/0250907 A1* | 10/2011 | Giniger | ............ | G06F 17/3087 455/456.3 |
| 2012/0096358 A1* | 4/2012 | Barnes, Jr. | ............ | G06Q 10/1053 715/728 |

OTHER PUBLICATIONS

NonFinal Office Action in U.S. Appl. No. 11/196,387, mail date: Jul. 28, 2008.

"The Workbench for Microsoft Access Help Guide," Compacting a Database (Using the Workbench), http://www.vb123.com/workbench/help/compact.htm, accessed date: Jan. 4, 2009.

Final Office Action in U.S. Appl. No. 11/196,387, mail date: Jan. 6, 2009.

NonFinal Office Action in U.S. Appl. No. 11/196,387, mail date: May 28, 2009.

NonFinal Office Action in U.S. Appl. No. 12/764,276, mail date: Feb. 16, 2012.

Final Office Action mailed Jun. 13, 2013 in U.S. Appl. No. 13/572,974.

Non Final Office Action mailed Dec. 19, 2012 in U.S. Appl. No. 13/572,974.

Notice of Allowance mailed Sep. 24, 2013 in U.S. Appl. No. 13/572,974.

Notice of Allowance Mailed Jul. 10, 2012 in U.S. Appl. No. 12/764,276.

* cited by examiner

Map & Driving Directions — 300

Location A — 310

- Paste Address as Location A — 311
- Previous locations: — 312
- Address, Intersection or Place name: — 313
- City: — 314
- State: — 315
- Zip code: — 316
- Get Directions — 317

Location B — 320

- Paste Address as Location B — 321
- Previous locations: — 322
- Address, Intersection or Place name: — 323
- City: — 324
- State: — 325
- Zip code: — 326
- Direction — 327
  - To here
  - From here
- Route Type — 328
  - Quickest
  - Shortest
- Map Style — 329
  - Standard
  - Line Drive

OK — 330

Cancel — 340

City: ~ 314

Sp

Spade
Spalding
Spanaway
Spangle
Spangler
Spanish Fork

USER INTERFACE AND GEO-PARSING DATA STRUCTURE

PRIORITY

This patent claims the benefit of and is a continuation of U.S. application Ser. No. 13/572,974, which was filed on 13 Aug. 2012, U.S. application Ser. No. 12/764,276, which was filed on 21 Apr. 2010 and was a divisional of U.S. application Ser. No. 11/196,387, which was filed on 4 Aug. 2005 and each of the above applications is incorporated herein by reference in their entirety.

BACKGROUND

Currently, the Internet is an outstanding resource for receiving directional information for points-of-interest or landmarks. Typically, a user inputs address information to specify an origin and destination. The user provides information that represents a street, city, state, or zip for the origin and destination. After providing all necessary information the user sends the address information to a server that generates the directional information.

When the address information for the origin or destination is incomplete or mistakenly transcribed, entering the address information may become very tedious. For instance, a user that enters address information for the destination and origin but provides an incorrect zip code for the destination and sends the address information to the server may receive a response from the server indicating that the zip code for the destination is invalid. This is an inefficient response, which imposes a burden on the user to find a correct zip code and increases the amount of time before the user receives the directional information. Moreover, the server storing the address information may include a large database that increases the response time because the server inefficiently stores and accesses the address information.

SUMMARY

A compact geo-parsing data structure efficiently generates directional information and enables automatic completion or correction of address information. The compact geo-parsing data structure includes a header, body and trailer section. The header section includes metadata about the information stored in the data structure. The body section includes location data utilized to correct or complete the address information. The trailer section provides applications with information on how to access the data structure. Moreover, the trailer section provides version information to allow data sources to update the compact data structure. Accordingly, applications that request directional information may utilize the compact geo-parsing data structure to validate the address information.

This Summary is provided to introduce a selection of concepts in a simplified form that are further described below in the Detailed Description. This Summary is not intended to identify key features or essential features of the claimed subject matter, nor is it intended tot be used as an aid in determining the scope of the claimed subject matter.

DETAILED DESCRIPTION

Embodiments of the invention provide a compact data structure that provides client side validation of address information. The data structure is loaded into memory and organized to reduce the number of disk accesses required to process a request for directional information. Moreover, a graphical user interface that receives the address information utilizes the compact data structure to automatically correct or complete the address information. Also, the graphical user interface utilizes the data structure to copy-and-paste or drag-and-drop the address information from other applications. Accordingly, embodiments of the invention provide the data structure and graphical user interface to efficiently process address information.

Figure 1:
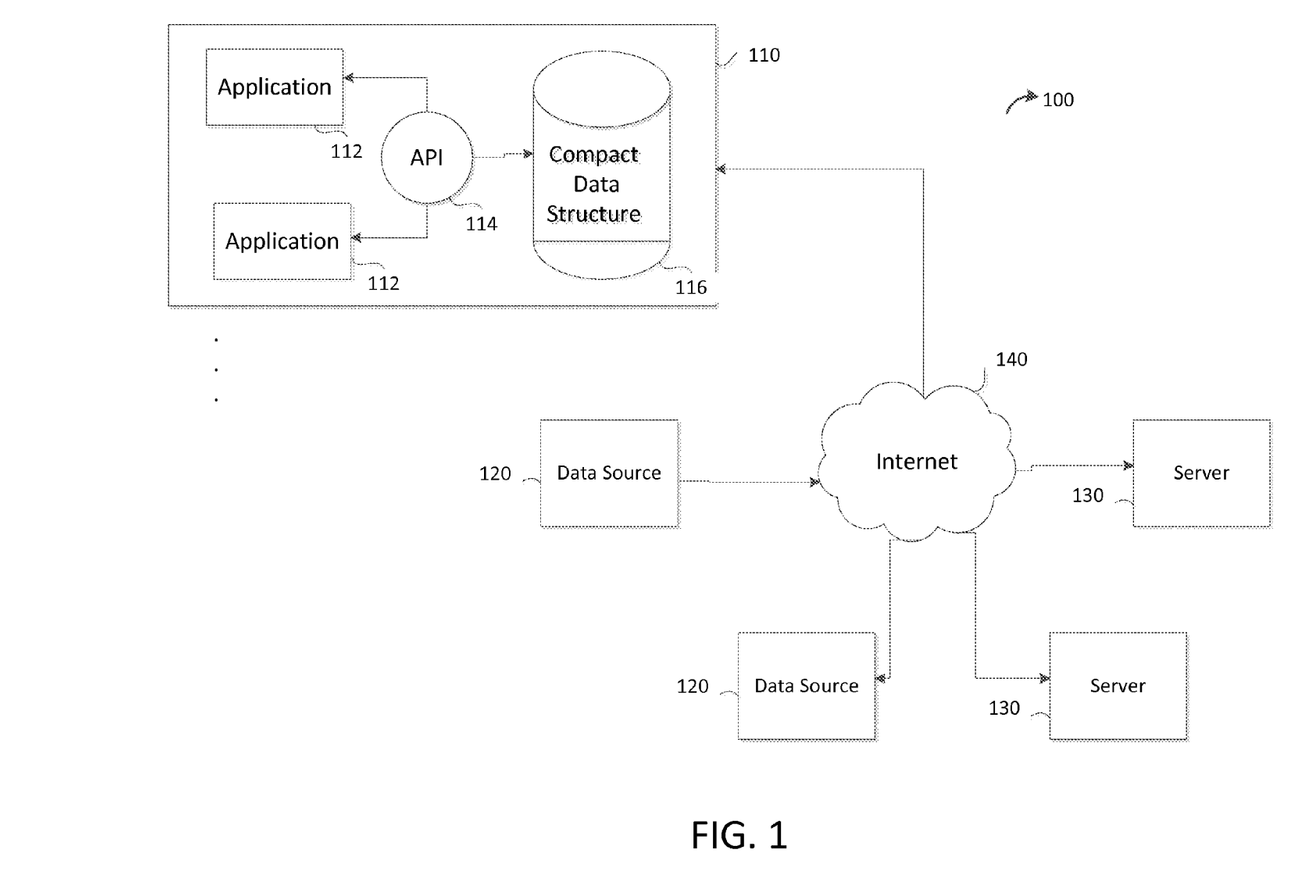
FIG. 1 illustrates a block diagram of an exemplary computing environment utilized by embodiments of the invention.

FIG. 1 illustrates a block diagram of an exemplary computing environment 100 utilized by embodiments of the invention. The computing environment 100 is not intended to suggest any limitation as to scope or functionality. Embodiments of the invention are operable with numerous other special purpose computing environments or configurations. With reference to FIG. 1, the computing environment 100 includes client computers 110, server computers 130, data sources 120 and a communication network 140.

The client and server computers 110 and 130 each have processing units, coupled to a variety of input devices and computer-readable media via communication buses. The computer-readable media may include computer storage and communication media that are removable or non-removable and volatile or non-volatile. By way of example, and not limitation, computer storage media includes electronic storage devices, optical storages devices, magnetic storage devices, or any medium used to store information that can be accessed by client computers 110, and communication media may include wired and wireless media. The input devices may include, mice, keyboards, joysticks, controllers, microphones or any suitable device for providing user input to the client computers 110.

Additionally, the client computers 110 may store application programs 112 that provide computer-readable instructions to implement various heuristics. In an embodiment of the invention, the client computers 110 store a compact data structure 116 that provides address information. The compact data structure communicates with application programs 112 via an application programming interface (API) 114. The API receives application requests and accesses the compact data structure 116 to generate responses to the application requests. Application requests may include copy-and-paste or drag-and-drop requests.

The client computers 110 communicate with data sources 120 and server computers 130 over the communication network 140. The communication network 140 may be a local area network, a wide area network, or the Internet. The client computers 110 may include laptops, smart phones, personal digital assistants, and desktop computers. The server computers 130 may include map servers, search engines, or web servers. The server computers 130 may receive address information and generate directional information based on the address information. The data sources 120 may include individuals or companies that gather information on changes in address information, such as, for example, a creation or destruction of a zone-improvement-plan code (zip code). The information collected by the data sources 120 is periodically sent to client computers 110 to update the compact data structure 116. Accordingly, the compact data structure 116 provides a current representation of the address information in a geographic region. The computing environment illustrated in FIG. 1 is exemplary and other configurations are within the scope of the invention.

Figure 2:
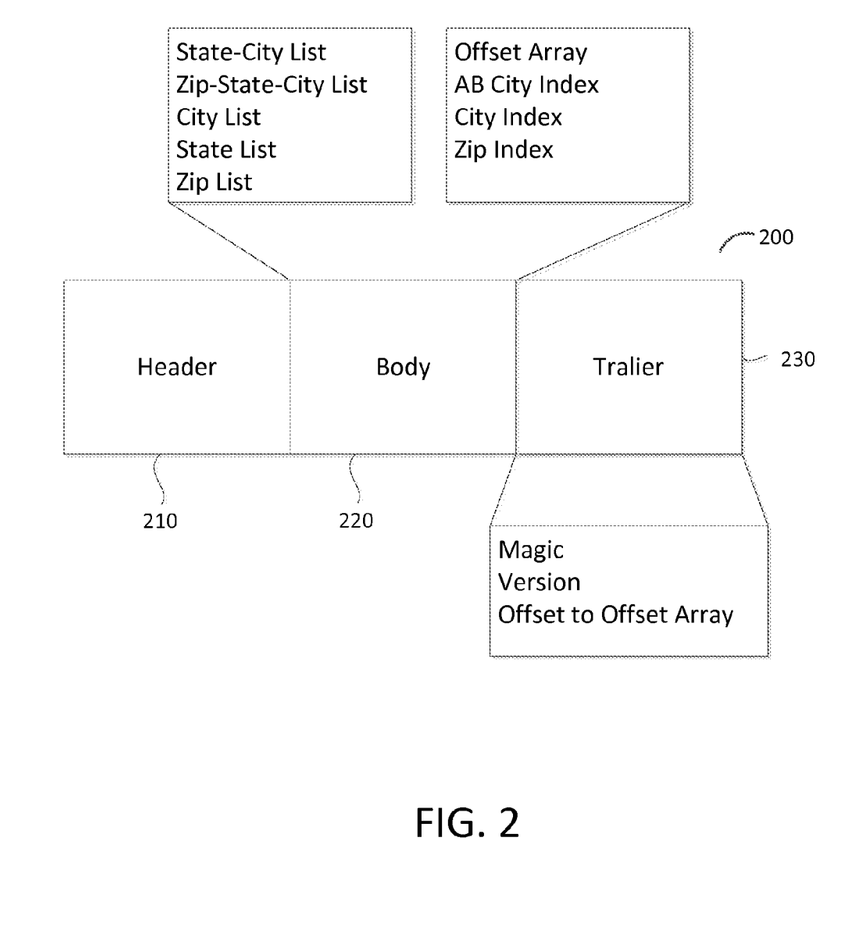
FIG. 2 illustrates an exemplary format for a geo-parsing data structure utilized by embodiments of the invention.

FIG. 2 illustrates an exemplary format for a geo-parsing data structure 200 utilized by embodiments of the invention. In an embodiment of the invention the compact data structure 116 may be implemented by the geo-parsing data structure 200. The geo-parsing data structure 200 organizes address information that includes approximately 18,000 city-state combinations to allow applications to efficiently access the address information. In an embodiment of the invention, the geo-parsing data structure 200 is optimized for address information for the United States of America. In alternate embodiments of the invention, the geo-parsing data structure 200 may include international address information.

With reference to FIG. 2 the geo-parsing data structure 200 includes a header 210, body 220 and trailer 230 sections. The trailer section provides layout information for the geo-parsing data structure 200, which enables an application to access the address information. In an embodiment of the invention, the address information is stored in little endean format. The trailer section 230 may include magic, version, and offset attributes that provide the application with the layout information. Table 1 provides a description of some attributes included in the trailer section 230 of the geo-parsing data structure 200. In an embodiment of the invention, all unsigned Long (ulong) type data is assumed to be 4 bytes long, all unsigned Short (ushort) type data is assumed to be 2 bytes long and all unsigned byte (ubyte) type data is assumed to be 1 byte long.

TABLE 1

| Name | Size | Description |
| --- | --- | --- |
| Magic | 4 bytes (ulong) | Magic verifies that this is indeed a zip data file |
| Version | 4 bytes (ulong) | Version is provided for forward and backward compatibility |
| Offset to the Offset Array | 4 bytes (ulong) | The offset array provides an index of offsets into the relevant lists (See Table 2) |

The magic attribute specifies whether the geo-parsing data structure 200 has been compressed using a file compression technology such as, for example, ZIP, or RAR. The version attribute allows data sources 120 to update or modify the address information stored in the geo-parsing data structure 200. The version attribute allows the geo-parsing data structure 200 to be dynamic. As described below, the body 220 of the geo-parsing data structure may include various lists. The number of lists represented in the body 220 varies depending on the version attribute. The application may require that the geo-parsing data structure 200 have a minimum version number. In an embodiment of the invention, the application checks the version of the geo-parsing data structure to determine whether the geo-parsing data structure 200 is updated. Moreover, when the lists included in the body 220 are updated to include new streets, new zip code, the version attribute may be incremented by a specified unit. Moreover, the version attribute may be incremented when the body 220 is updated to include application-specific indices, such as, for example, an index that may speed up responses to application requests by arranging cities based on a specified number characters of the city name. In an embodiment of the invention, the specified number of characters is two and the index is referred to as an ab city index. The offset attribute specifies a location in the geo-parsing data structure 200 where an offset array is stored. Thus, the offset attribute provides an entry point into the geo-parsing data structure at which the address information is stored.

The offset array is a collection of offset-count pairs for various lists and indices included in the body 220 of the geo-parsing data structure 200. An offset-count pair specifies the location of a list in the geo-parsing data structure 200 and the size of the list. The offset array enables an application to efficiently access the address information stored in the geo-parsing data structure 200. When the geo-parsing data structure 200 is updated to include future lists or indices, the offsets to the list or indices are added to the end of the offset array. In an embodiment of the invention, the list and indices are stored in an order that is most useful for the application, such as, for example, an order in which locality of reference is optimized Table 2 below provides a description of the offset array included in the body 220 of the geo-parsing data structure 200. In an embodiment of the invention, if the offset is set to −1, the list or index does not exist.

TABLE 2

| Offset & Count | Access | Description |
| --- | --- | --- |
| Offset(ulong) count(ulong) | city-state-zip list | This is a list of cities with the states in which a city with that name occurs and the zip codes within that city listed for each city. |
| Offset(ulong) count(ulong) | state-city list | The list of cities in each state |
| Offset(ulong) count(ulong) | zip-state-city list | The state and city for each zip code with an overflow in case a zip code extends to multiple cities |
| Offset(ulong) count(ulong) | city list | The list of cities |
| offset(ulong) count(ulong) | state list | The list of states |
| offset(ulong) count(ulong) | zip list | The list of zip codes (this is a sparse array) |
| Offset(ulong) count(ulong) | ab city index | The index into the city list in the "AB" format. Meaning, given the first one or two letters, the offset into the first entry in the city list that begins with the given letter(s) is stored for quick access. |
| Offset(ulong) count(ulong) | city index | The index into the city list. The first entry points to the first city name in the city list, the second to the second in city list and so on. This serves dual purposes one, a given city can be quickly located in the city list and two, a given city name can be referenced anywhere in four bytes. |
| offset(ulong) count(ulong) | zip index | The index into the zip list, which is a sparse array. This index has one entry per every interval of n numbers (interval size may be changed later, but currently n = 50) - meaning, the first entry points to the first zip code, second points to the first zip code entry >=50 when treated as a number, third to the first zip code >=100 when treated as a number and so forth. |

The body 220 includes an offset array that provides offset-count pairs for, a city list, a state list, a zip list, a zip-state-city list, a city-state-zip list, a state-city list, an ab city index, a city index, and a zip index. The offset array may include other offset count-pairs not described in Table 2 above. The lists and indices represented by the offset-count pairs will be described in more detail below.

The city list provides a list of all cities represented in the geo-parsing data structure 200. The city list also includes the name of the city and length of the city name. The city list also, stores offsets to locations in the geo-parsing data structure 200 that references each city. The city list may have the structure illustrated in Table 3 below.

TABLE 3

| Name | Size | Description |
| --- | --- | --- |
| City-State-Zip list offset | ulong | The offset into the city-state-zip list described below. |
| Length | ubyte | The length of the city name |
| City name | variable string | The city name, as a string of consecutive characters |

The city list avoids the storage of duplicates city names and provides the names of all the cities and locations where the cities are listed, such as, for example, in the city-state-zip list.

The state list provides a representation of all states in the geo-parsing data structure. The state list provides a name, which may be abbreviated, for each states and a length of the name. The state list also includes an offset to locations in the geo-parsing data structure 200 that reference each state. The state list may have the structure illustrated in Table 4 below.

TABLE 4

| Name | Size | Description |
| --- | --- | --- |
| State-City offset | Ulong | The offset into the list of cities in this state (State-City list) |
| Length | Ubyte | The length of the state code. |
| State code | variable string | Typically two bytes. |

The state list provides the state names and references to locations in the state-city list providing references to all cities for a corresponding state. In an alternate embodiment of the invention, the states are not abbreviated.

The zip list provides all valid zip codes, each entry indicates the city (or cities, in case of an overflow) and state for each zip code. The zip list includes an overflow bit, offsets to location in the geo-parsing data structure 200 for each state and city represented within the state list and city list. The zip list may have the structure illustrated in Table 5 below.

TABLE 5

| Name | Size | Comments |
| --- | --- | --- |
| Overflow present? | 1 bit (part of zip code below) | Most zip codes exist in only one city. But some (very few) may span multiple cities. To accommodate that possibility, we reserve the top bit of the zip code field to indicate if there is an overflow. In case of overflow, the overflowed data is stored in the zip-state-city overflow list described later in this document. |
| Zip code | Ushort | The zip code (valid values range from 0-99999) |
| State Index | Ushort | The index into the list of states |
| City Index | Ushort | The index into the list of cities |

The zip list may be a fixed size to enable applications to quickly locate a zip code by using a zip index that stores zip code entries in increments of n. Therefore, dividing the zip code by n provides an approximate location of the zip in the zip index. The zip index is accessed at the approximate location and a segment of the zip list corresponding to the approximate location is read into the memory and linearly traversed to locate the zip code. In an alternate embodiment of the invention, the zip code may be located via a divide-and-conquer strategy.

The zip-state-city list is an overflow list that represents zip codes that cover more than one city or state. The zip-state-city list provides a count of the number of cities or states in the overflow list and an index or pointer in the city or state list that represents the city or state included in the overflow list. The zip-state-city list may have the structure illustrated in Table 6 below.

TABLE 6

| Name | Size | Description | | |
| --- | --- | --- | --- | --- |
| Count | Ubyte | How many items are in this overflow list? | | |
| List | Variable array | A list of the following structures: | | |
| | | Name | Size | Comments |
| | | State Index | Ubyte | The index of the state in the state list |
| | | City Index | Ushort | The index of the city in the city list |

A zip code normally represents distinct geographic regions. However, development of the geographic regions represented by the zip code may cause two cities to share the zip code. Accordingly, the overflow list allows representation of cities sharing a zip code.

The city-state-zip list organizes the states and zip codes based on city name. Each city in the United States of America may have one or more entries in the city-state-zip list. The city-state-zip list may include a count, state index and zip code. The information stored in the city-state-zip list may be organized according to the layout shown in Table 7 below.

TABLE 7

| Name | Size | Description |
| --- | --- | --- |
| Count | Ushort | The number of state-zip pairs associated with this city name. |
| State Index | Ubyte | The index into the state list |
| Zip code | Ushort | The zip code in question. |

For instance, a city called Springfield may be located in more than 5 states. Accordingly, the count specifies the number of state-zip pairs that includes a city having the name Springfield. For each state-zip pair, a state index specifies a location in the state list having information about the state, and the zip code specifies the zip code associated with the city and state. Accordingly, Springfield may have more than five state-zip pairs.

The state-city list provides a listing of cities in each state. The state-city list gives the number of cities in each state, and an index or pointer to each city stored in the city list. Each of the entries in this list follows the structure as illustrated in Table 8 below.

TABLE 8

| Name | Size | Description |
| --- | --- | --- |
| Count | Ushort | The number of cities in this state |
| City Index | Ushort | The index into the city list. |

For instance, "District of Columbia," would have a count representing one city and the index would point to an entry storing "Washington" in the city list. Accordingly, once a state is chosen the list of valid cities in the state are listed and if only one city is within the selected state, the city is automatically selected and presented to a user.

The ab city, city and zip indices provide references or points to city list, or zip list. The ab city index provides offset to each city based on at least the first two characters of each city name. For instance, "Ch" will provide references to all cities stored within the geo parsing data structure 200 that begin with "Ch" to facilitate fast access to the list of cities. The city index provides references or points to each city in the city list. The reference allows a city and the information associated with the city to be retrieved based on the reference. The zip index may be a sparse list, having references that represent zip codes in increments of n, such as, for example, fifty. In an embodiment of invention, each index may be implemented as an array of references. Accordingly, the geo-parsing data structure 200 provides a complex data domain in a compact and searchable format. Also, the geo-parsing data structure 200 may be memory mapped to provide efficient access to address information. Moreover, some lists, such as the city list may be preloaded based on access frequency. Therefore, all address information can be accessed efficiently on demand with a minimum number of seeks, and applications utilizing the geo-parsing data structure 200 may read consecutive memory blocks storing address information with the size of the read known ahead of time.

Figure 3:
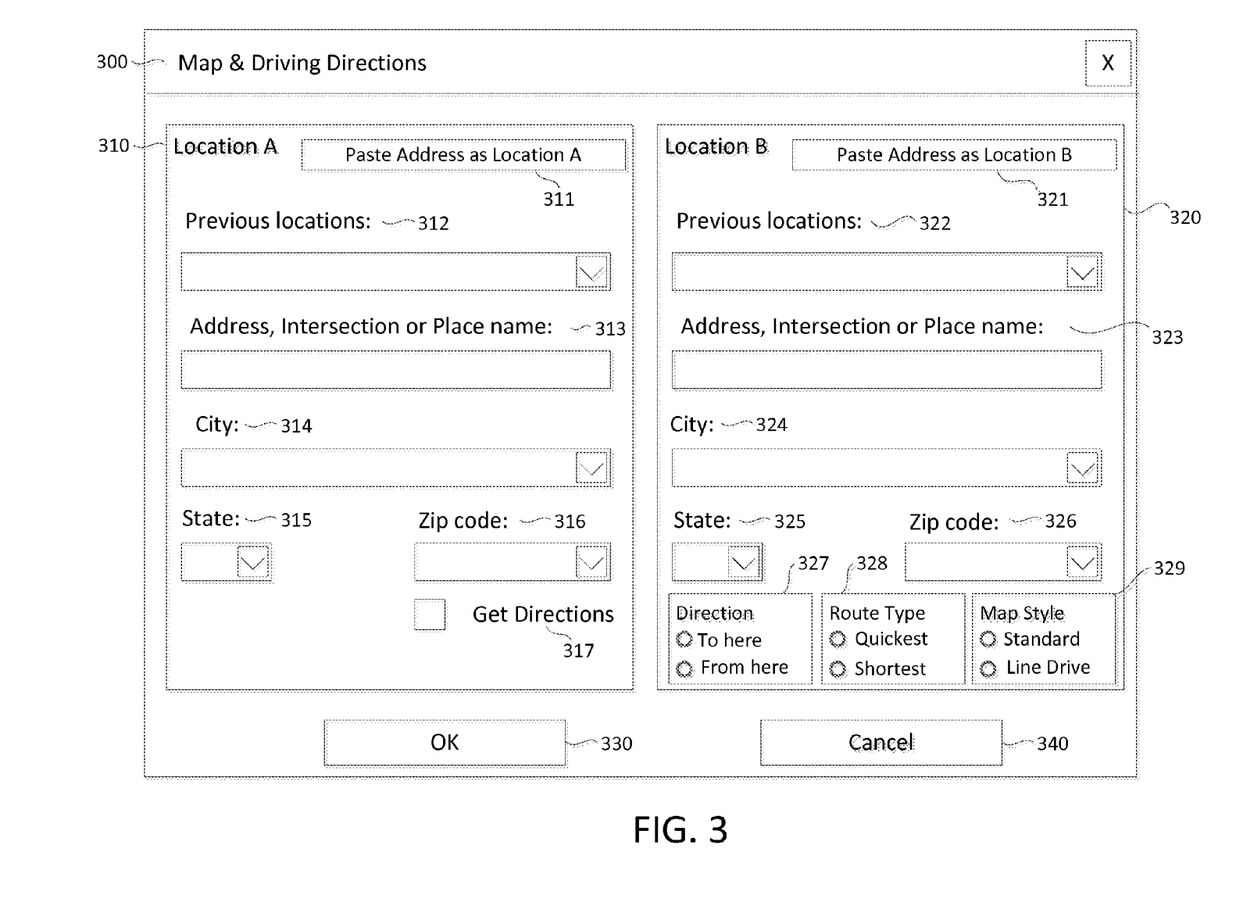
FIG. 3 illustrates a graphical user interface utilized by embodiments of the invention.

FIG. 3 illustrates a graphical user interface 300 utilized by embodiments of the invention. The graphical user interface 300 provides a form where a user may enter address information to retrieve directional or map information. The graphical user interface 300 includes a section for location A 310 and location B 320, an ok button 330 and a cancel button 340.

The location A 310 and location B 320 sections provide fields where a user can enter address information. The location A and B sections 310 and 320 include paste address buttons 311 and 321 that allow a user to populate the address fields using information copied from another application. The paste address buttons 311 and 321 enable a copy-and-paste functionality on the graphical user interface 300. The location A and B sections 310 and 320 include a previous locations field 312 and 322 that lists addresses that were entered previously at each section. The previous locations field 312 and 322 allows a user to quickly access previous address information. The location A and B sections 310 and 320 provide address fields 313 and 323, city fields 314 and 324, state fields 315 and 325 and zip code fields 316 and 326. Each field collects information pertaining to a portion of address information that specifies location A and B 310 and 320. A get directions check box 317 allows a user to specify whether to retrieve a map or directions from location A to B. When the get directions check box 317 is checked, the user is presented with the directional information. Additionally, the user can specify the type of directional information presented by utilizing the direction option 327, route type option 328 or map style option 329. The direction option 327 allows the user to specify which location should be the origin. The route type option 328 specifies whether the user prefers a short or quick route, and the map style option 329 allows the user to specify how the directional information is displayed. The graphical user interface 300 allows the address information to be copied and pasted using the paste address buttons 311 and 321 as either location A or B 310 or 320. In an embodiment of the invention, a user is restricted from completing address information in location B 320 until at least city, zip, or state information for location A 310 is provided in fields 314, 315 or 316. The restriction may be presented by preventing access to location B 320 or graying out fields on location B, such as for example, fields 322-329.

In addition to the copy-and-paste functionality, the graphical user interface 300 allows a user to drag-and-drop address information from an application to the graphical user interface 300. The graphical user interface 300 utilizes the geo-parsing data structure 200 to validate or complete the address information retrieved from copy-and-paste or drag-and-drop actions of the user. Address information and surrounding text can be drag-and-dropped or copy-and-pasted from any application onto the graphical user interface 300 and parsed to extract the appropriate address information to set the fields of location A and B 310 and 320 with valid address information. The API receives the address information and parses the address information utilizing the geo-parsing data structure 200 to validate and correct or complete address information. Accordingly, the geo-parsing data structure provides client-side validation and reduces messages transmitted when an incomplete or incorrect address is sent to a map server or search engine.

Figure 5A:
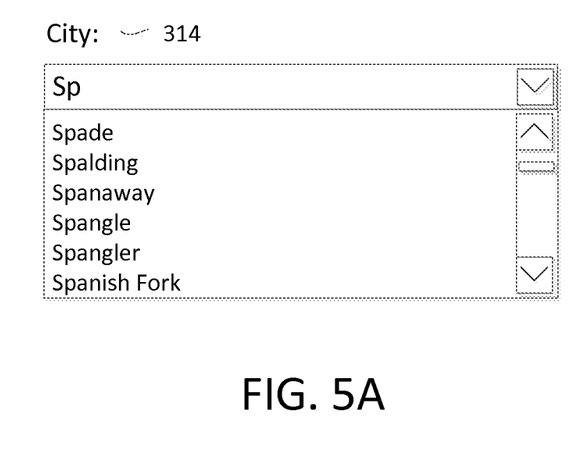
FIG. 5A and FIG. 5B illustrate screen shots of fields on the graphical user interface utilizing the geo parsing data structure.
Figure 5B:
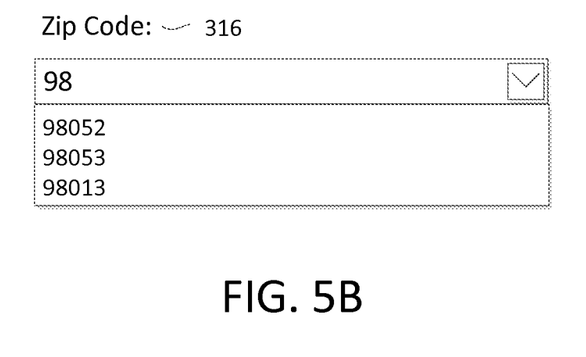

Also, the geo-parsing data structure 200 enables numerous efficiencies when entering address information. In an embodiment of the invention, when a user partially types in a city or state, the user receives an "auto-complete" of the state or city, which may be received from the ab city index and sent to the graphical user interface 300. FIG. 5A and FIG. 5B illustrate screen shots of fields on the graphical user interface 300 utilizing the geo parsing data structure 200. With reference to FIG. 5A, when a user types "Sp" in the city field 314, the user is presented with a set of cities beginning with "Sp." Once an appropriate city is selected, "Spade," the state and zip fields 314 and 315 or 324 and 325 are restricted to states and zips that are related to the selected city. If there is only one city with the name specified by the user, then the state and zip code fields 315 and 316 or 325 or 326 are immediately filled and need not be filled in by a user. With reference to FIG. 5B, when a city that is present in multiple states is entered by the user in the city fields 314 or 324, and a state is selected in the state field 315 or 325, the zip code fields 316 and 326 are restricted to zip codes applicable to that particular city. If there is only one zip code associated with the city, the zip code field 316 or 326 is automatically filled in. When a zip code is provided in zip code fields 316 or 326, the city and state fields 314 and 315 or 324 and 325 are automatically filled without further user intervention. Moreover, when a city and state are selected, the zip code fields 316 or 326 is capable of auto completion because the zip codes are restricted to zip codes related to city and state. For instance, if the user specifies the state to be Washington and the city to be Redmond, the zip code field 326 is restricted to valid zip codes in the Redmond area. When there is only one zip code associated with the city, that zip code is selected and the user does not have to enter zip code information. Accordingly, the geo-parsing data structure 200 allows applications utilizing forms or interfaces that collect address information, similar to graphical user interface 300, to quickly validate and complete or correct the address information.

Figure 4:
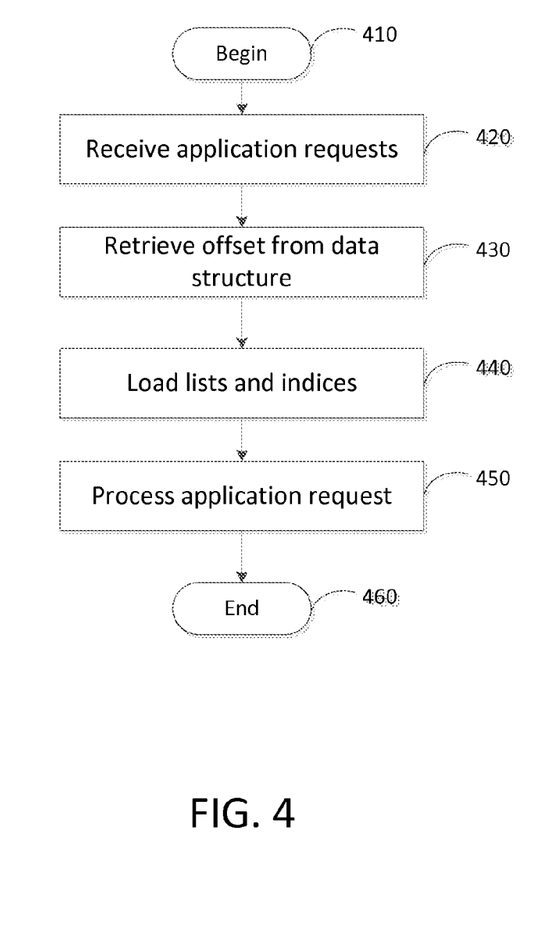
FIG. 4 illustrates a flow diagram of a method to allocate memory for the geo-parsing data structure utilized by embodiments of the invention.

FIG. 4 illustrates a flow diagram of a method to allocate memory for the geo-parsing data structure utilized by embodiments of the invention.

The method begins in step 410, after the geo-parsing data structure 200 is installed on client computer 110. The API 114 associated with the geo-parsing data structure 200 receives application requests containing address information, in step 420. The API 114 retrieves the offset from the geo-parsing data structure 200, in step 430. The offset points to locations in the geo-parsing data structure 200 storing the list and indices, and the API 114 loads the list and indices into memory, in step 440. The API 114 processes the address information, utilizing the list and indices loaded into memory, in step 450. The method ends in step 460.

The geo-parsing data structure 200 is a compact and efficient storage format that enables the validation of address information. The geo-parsing data structure 200 may be implemented as a browser extension or an operating system utility. Accordingly, applications executing on client computer 110 can utilize the geo-parsing data structure 200.

Figure 6:
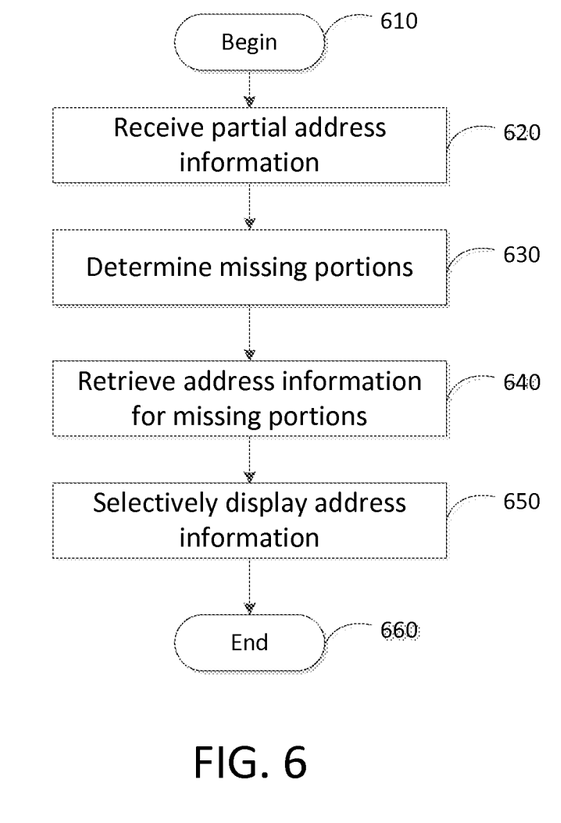
FIG. 6 illustrates a flow diagram of a method to provide selections that complete partial address information.

FIG. 6 illustrates a flow diagram of a method to provide selections that complete partial address information.

The method begins in step 610, which may occur after the geo-parsing data structure 200 has been loaded into memory. In step 620 partial address information is received at a client computer from one or more applications executing on the client computer 110 via a client computer action, such as, for example, copy-and-paste or drag-and drop. The partial address information is parsed to determine the missing portions of the partial address information, in step 630. The missing portions may relate to a city, state, or zip code, etc. The geo-parsing data structure 200 is traversed to determine the address information for the missing portions, in step 640. The address information associated with the missing portions is selectively displayed, in step 650. The method ends in step 660.

The partial address information includes information relating to a location of a point of interest, business, or residence. The partial address information includes information related to fields of the graphical user interface 300. In an embodiment of the invention partial address information omits information related to one or more of the fields 313-316 or 323-326 of either location A 310 or location B 320. Furthermore, the partial address information may include information that is incorrectly transcribed. The omitted information is a missing portion that will complete the partial address information, and the geo-parsing data structure 200 is consulted to find address information related to the missing portions of the partial address information. When a user enters partial address information, such as, for example, address information missing only state information, the partial address information is parsed to determine the information related to the fields that are omitted. For instance, the partial address information entered by the user is parsed to detect that state information is missing, and the geo-parsing data structure 200 is consulted to determine the state information corresponding to the omitted information utilizing the received zip or city information. The state information corresponding to the missing portion is selectively displayed on a display device at the client computer. Accordingly, the partial address information is validated to ensure that the address information has been entered properly and the geo-parsing data structure 200 provides information to complete the partial address information. In an embodiment of the invention, applications that have complete address information may utilize the geo parsing data structure 200 to validate the complete address information.

In sum, applications in communications with an API and a geo-parsing data structure can process address information to validate, correct, or complete the address information. The geo-parsing data structure is a dynamic structure that may be transmitted from one or more data sources and stored on client computers to provide efficient access to address information for locations represented by the geo-parsing data structure. Alternative embodiments of the invention provide a graphical user interface having a plurality of fields utilizing a compact data structure having address information to auto-complete the plurality of fields, the graphical user interface includes a first set of the plurality of fields to receive a first address information, a second set of the plurality of fields to receive a second address information, and paste buttons to automatically fill in the plurality of fields associated with the first and second address information. When the first or second address information is copied, depressing the paste buttons automatically fills in appropriate fields with the copied address information. Also, if the first or second address information is dragged and dropped onto the graphical user interface appropriate fields are completed. Automatically filling in the plurality of fields includes parsing the first or second address information provided by a user, and restricting a set of options presented to the user when either a city or zip code is entered into the graphical user interface. The compact data structure enables the validation of the first or second address information, because the compact data structure stores valid address information. Accordingly, the compact data structure auto-completes the first or second address information with valid address information. The foregoing descriptions of the invention are illustrative, and modifications in configuration and implementation will occur to persons skilled in the art. For instance, while the invention has generally been described with relation to FIGS. 1-6, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. A computer-implemented method to provide selections that complete partial address information, the method comprising:

receiving a request including the partial address information at a graphical user interface having a set of fields for geographic locations, wherein the partial address information completes less than all of the fields included in the set of fields;

parsing the partial address information to determine missing portions of the partial address information;

locating, in a compact data structure, offsets to address information corresponding to the missing portions, wherein the compact data structure organizes geographic location information and includes a header section, a trailer section and a body section, wherein the header section provides metadata to a plurality of applications, the trailer section specifies at least the offsets allowing the plurality of applications to access the data structure and a version allowing one or more data sources to update the data structure, and the body section having the address information represented by a plurality of offset count pairs, wherein the offsets to address information specifies the location in the compact data structure where the address information corresponding to the missing portions of the partial address information from the request is stored, and wherein the compact data structure is updated periodically to update the version and the offsets to address information; and generating, for selective display, a set of options that includes the address information corresponding to the missing portions that complete a subset of the set of fields in the graphical user interface and restricts the set of options to a number of potential addresses that complete the partial address information.

2. The method according to claim 1, further comprising validating the partial address information.

3. The method according to claim 1, further comprising completing the fields of the missing information based on user selections that complete the partial address received at the graphical user interface.

4. The method according to claim 1, further comprising restricting states and zip codes selectively displayed in a zip code field and a state field of the missing information to states and zip codes related to a city included in the partial address information.

5. The method according to claim 3, further comprising restricting cities and states selectively displayed in a state field and a city field of the missing information to cities and states related to a zip code included in the partial address information.

6. The method according to claim 1, wherein the compact data structure is memory-mapped.

7. A computing device having processors and memories, wherein the memories store a compact data structure and computer executable instructions:

the compact data structure is configured to organize geographic location information and includes a trailer section specifying at least a version and an offset to location data, wherein the trailer section allows a plurality of applications to access the data structure, and the version allows one or more data sources to update the data structure, a body section having the location data represented by a plurality of offset count pairs, and a header section providing metadata to the plurality of applications, the computer-executable instructions when executed by a processor configure the computing device to provide selections that complete partial address information by further configuring the computing device to:

provide an application request having partial address information;

render a graphical user interface having a set of fields for geographic locations, wherein the partial address information from the application request completes less than all of the fields included in the set of fields;

update the graphical user interface by generating, for selective display based on the location data stored in the compact data structure, a set of options that includes address information corresponding to missing portions that complete a subset of the set fields in the graphical user interface, wherein the offset to the location data specifies the location in the compact data structure where the address information corresponding to the missing portions of the partial address information from the request is stored, and wherein at least the version and the offset to the location data of the compact data structure are periodically updated.

8. The computing device of claim 7, wherein the location data includes cities, roads, or points of interest.

9. The computing device of claim 7, wherein the set of options is restricted to a number of potential addresses that complete partial address information from the application request.

10. The computing device of claim 7, wherein the instructions executing on the computing device configure the computing device to read at least one of the plurality of offset-count pairs to determine a location of a list of cities in the data structure, and a number of cities in the list of cities.

11. The computing device of claim 7, wherein the compact data structure is in a compressed format.

12. The computing device of claim 7, wherein the compact data structure is organized to optimize reference locality.

13. The computing device of claim 7, wherein updating the compact data structure appends data after the trailer section.

14. A computing system comprising:

a processor; and computer storage memory having computer-executable instructions stored thereon which, when executed by the processor, configure the computing system to:

receive from a graphical user interface, a request including the partial address information at a graphical user interface having a set of fields for geographic locations, wherein the partial address information completes less than all of the fields included in the set of fields;

parse the partial address information to determine missing portions of the partial address information;

locate, in a compact data structure, offsets to address information corresponding to the missing portions, wherein the compact data structure organizes geographic location information and includes a header section, a trailer section and a body section, wherein the header section provides metadata to a plurality of applications, the trailer section specifies at least the offsets to address information allowing the plurality of applications to access the data structure and a version allowing one or more data sources to update the data structure, and the body section having the address information represented by a plurality of offset count pairs, wherein the offsets to address information specifies the location in the compact data structure where the address information corresponding to the missing portions of the partial address information from the request is stored, and wherein the compact data structure is updated periodically to update the version and the offsets to address information; and generate, for selective display, a set of options that includes the address information corresponding to the missing portions that complete a subset of the set of fields in the graphical user interface and restricts the set of options to a number of potential addresses that complete the partial address information.

15. The system of claim 14, further comprising the system configured to validate the partial address information.

16. The system of claim 14, further comprising the system configured to complete the fields of the missing information based on user selections that complete the partial address received at the graphical user interface.

17. The system of claim 14, further comprising the system configured to restrict states and zip codes selectively displayed in a zip code field and a state field of the missing information to states and zip codes related to a city included in the partial address information.

18. The system of claim 16, further comprising the system configured to restrict cities and states selectively displayed in a state field and a city field of the missing information to cities and states related to a zip code included in the partial address information.

19. The system of claim 14, wherein the compact data structure is memory-mapped.

* * * * *